(12) United States Patent
Bernard

(10) Patent No.: US 6,257,806 B1
(45) Date of Patent: Jul. 10, 2001

(54) DEVICE FOR CONVEYING NECKED OBJECTS AND FOR LOADING SUCH OBJECTS

(75) Inventor: Frédéric Bernard, Villeneuve d'Ascq (FR)

(73) Assignee: Sidel Societe Anonyme, Octeville sur Mer (FR)

( * ) Notice: Subject to any disclaimer, the term of this patent is extended or adjusted under 35 U.S.C. 154(b) by 0 days.

(21) Appl. No.: 09/194,992

(22) PCT Filed: Jun. 4, 1997

(86) PCT No.: PCT/FR97/00990

§ 371 Date: Aug. 10, 1999

§ 102(e) Date: Aug. 10, 1999

(87) PCT Pub. No.: WO97/46472

PCT Pub. Date: Dec. 11, 1997

(30) Foreign Application Priority Data

Jun. 4, 1996 (FR) .................................................. 96 07018

(51) Int. Cl.[7] .................................................... B65G 51/06
(52) U.S. Cl. ..................................... 406/189; 198/867.12
(58) Field of Search ............................ 406/88, 189, 184, 406/188; 198/67.12

(56) References Cited

U.S. PATENT DOCUMENTS

| 4,185,812 | * | 1/1980 | Hall .................................... 269/56 X |
| 4,684,012 | * | 8/1987 | Fedderson ................... 198/803.01 X |
| 4,944,635 | * | 7/1990 | Carlier et al. ...................... 406/10 X |

* cited by examiner

Primary Examiner—Christopher P. Ellis
Assistant Examiner—Kenneth W Bower
(74) Attorney, Agent, or Firm—Harrison & Egbert

(57) ABSTRACT

A device for conveying objects having a neck along a given direction having at least one pressure chamber capable of projecting an air flow on the objects along the conveying direction, and a support rail oriented along the conveying direction. The device includes transport shuttles fixed to the neck of the objects and cooperating with the support rail.

10 Claims, 3 Drawing Sheets

DEVICE FOR CONVEYING NECKED OBJECTS AND FOR LOADING SUCH OBJECTS

TECHNICAL FIELD

The present invention relates to a device for conveying objects provided with necks or the like, such as, for example, bottles, flasks or others articles, as well as to a device for loading such objects designed for the conveying device.

Although more especially designed for bottles, the present invention can also be use in all sectors of industrial activity in which there is occasion to move objects such as, in particular, recipients or containers, provided with necks or the like.

BACKGROUND ART

At present, in the field of bottle conveying, there are known, devices constituted, on one hand, by a compression chamber, enabling a stream of air to be projected onto the bottles so as to drive them in the conveying direction, and, on the other hand, by a rail, capable of supporting the said bottles by the collar or flange generally provided in the area of their necks.

The rail most often includes two guides, provided under the compression chamber, the latter being placed above the bottles to enable the stream of air to projected onto their necks.

Such devices have numerous drawbacks. In order to prevent the bottles from oscillating in a plane orthogonal to the conveying direction, they necessitate, in fact, the use of lateral guide members, provided in the area of the bodies of the bottles.

It should further be noted that, if the type or the format of the bottles changes, it is then necessary to make numerous, costly adjustments to the lateral guide members, along the entire length of the conveying path.

In addition, such devices are unable to prevent the bottles from oscillating longitudinally when transported, which only too often leads to bottles colliding, or again, to their -fanning out-, with a risk of obstructing the conveying process.

What is more, to be able to be transported by presently known conveying devices, the bottles have to have quite precise dimensions, particularly in the area of their collars. In addition, they must not be made of a material liable to heat up too quickly as a result of friction, such as PVC.

It should also be noted that such devices do not permit a satisfactory level of hygiene. The air projected onto the bottles in the area of their necks enters the bottles, with the risk of contaminating them, unless prior, filtering is provided, which is complex and expensive if it is to be reliable.

The object of the present invention is to overcome the aforementioned drawbacks by providing a device for conveying objects the guiding of which is simplified.

Another object of the present invention is to provide a device for conveying objects, having necks and bodies, the characteristics of which are independent of the dimensions and/or the shape of the bodies of the objects.

Another object of the present invention is to provided a device for conveying objects, provided with necks and bodies, that makes it possible to dispense with the use of lateral guide members in the area of the bodies of the objects.

A further object of the present invention is to provide a device for conveying objects that makes it possible to prevent the objects from oscillating longitudinally when they are transported and/or to prevent the occurrence of -fanning out- phenomena.

Another object of the present invention is to provide a device for conveying objects that makes it possible to reduce impact between the objects moved.

Another object of the present invention is to provide a device for conveying objects that makes it possible to improve the conditions of hygiene under which the objects are transported.

A further object of the present invention is to provide a device for conveying objects that can be applied, in particular, to driving bottles the dimensional tolerances in the area of the collars of which are broad, or even bottles having no collars.

Another object of the present invention is to provide a device for conveying objects permitting the transport of the latter regardless of the material of which they are made.

Another object of the present invention is to provide a device for loading objects designed for a device for conveying the objects which makes it possible to cause it to operate continuously and at high speed.

Further objects and advantages of the present invention will emerge in the course of the description that follows, which is given only by way of illustration and is not intended to limit same.

SUMMARY OF THE INVENTION

The present invention relates to a device for conveying objects provided with necks or the like such as, for example, bottles, flasks or other articles, in a given direction, constituted, at least, by a compression chamber, capable of enabling a stream of air to be projected onto the objects, in the conveying direction, and by a support rail, orientated in the conveying direction, characterised by the fact that it includes transport shuttles, secured, on one hand, to the necks of the objects and co-operating, on the other hand, with the rail.

The present invention also relates to a device for loading objects provided with necks or the like such as, for example, bottles, flasks or other articles, designed for a conveying device in which the objects are provided with transport shuttles, in their area of their necks, characterised by the fact that it includes:

means for causing the objects to be equipped with shuttles to move along;

means for causing the shuttles designed to be disposed on the objects to move along;

means for driving the shuttles and the objects facing one another along a given path;

means for securing the shuttles to the necks of the objects, capable of moving in synchronism with the shuttles and the objects, along the given path.

BRIEF DESCRIPTION OF THE DRAWINGS

The present invention will be more readily understood upon studying the following description, accompanied by the annexed drawings, which form an integral part thereof and wherein.

DETAILED DESCRIPTION OF THE INVENTION

The present invention relates to a device for conveying objects provided with necks or the like such as, for example, bottles, flasks or other articles, as well as to a device for loading such objects, designed for the conveying device.

Although more especially designed for bottles, the present invention will also find uses in all sectors of industrial activity in which it is wished to transport objects such as, in particular, containers provided with necks or the like.

Figure 1:
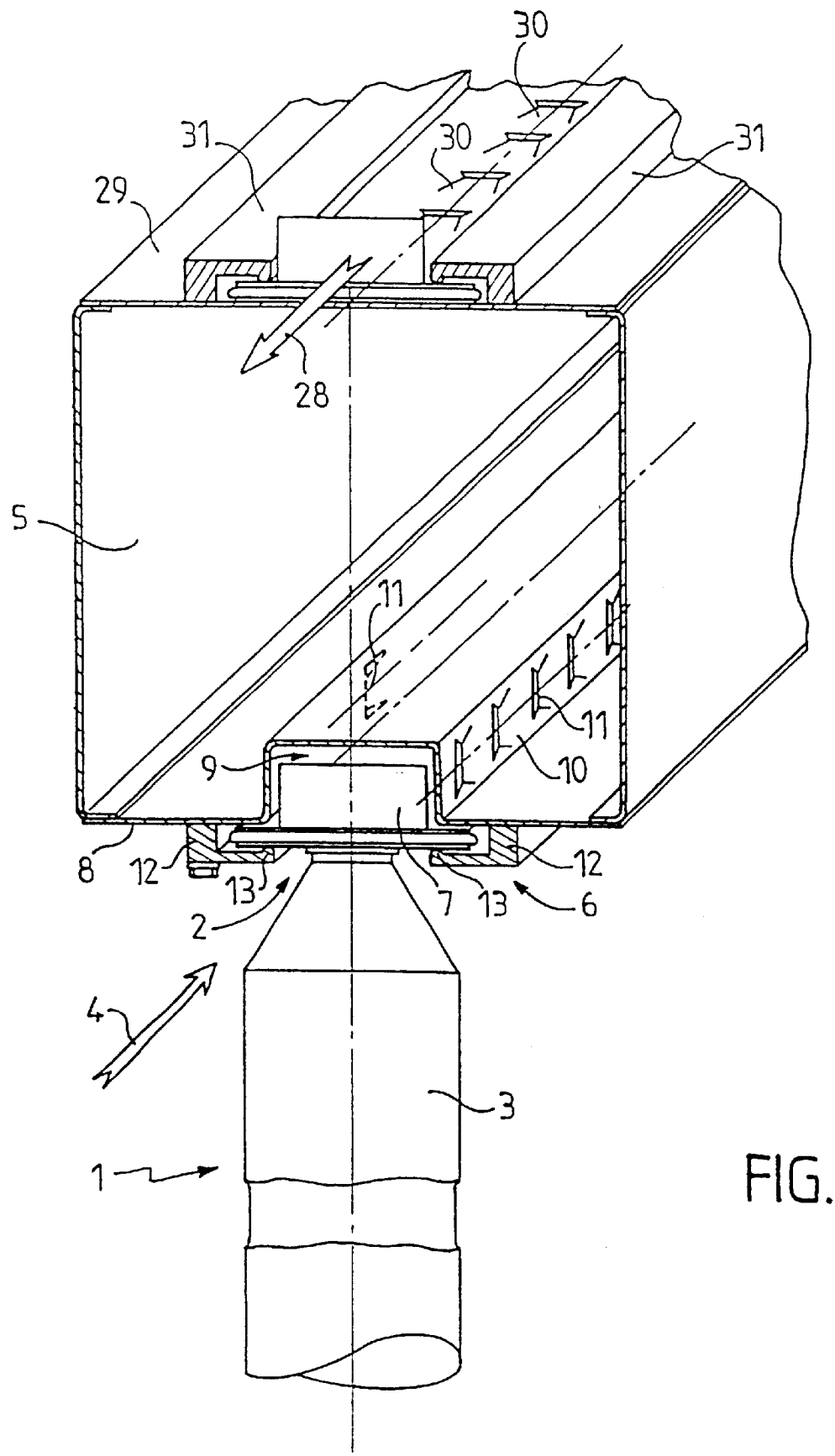
FIG. 1 illustrates in perspective illustration, taking a transverse cross-sectional plane, an example of a conveying device according to the invention.

As shown in FIG. 1, the device according to the invention permits the conveying of objects 1, provided with a neck 2 and, in particular, a body 3, in a given direction, illustrated by arrow 4.

The device is constituted, at least, by a compression chamber 5, suitable for enabling a stream of air to be projected onto the objects 1, in conveying direction 4, and by a support rail 6, orientated in the conveying direction 4.

The objects are thus driven, by means of the a air stream, for example, in a substantially horizontal conveying direction 4, the objects being, for their part, substantially vertically orientated.

Such a result is obtained, according to the techniques known to a man of the art, in particular, through the propulsion of air, via fans, not shown, into the chamber 5. The air is then in a compressed state inside the latter, and then projected outwards, in a unidirectional stream, through slits, having a suitable profile, provided on one of the walls of the compression chamber 5.

According to the invention, the device includes transport shuttles 7 secured, on one hand, to the neck 2 or the like of the objects 1, and cooperating, on the other hand, with the support rail 6.

Compression chamber 5 is disposed, in particular, continuously along the entire conveying path.

Moreover, according to the exemplary form of embodiment illustrated, the compression chamber 5 is provided above the objects 1 to be conveyed and enables the stream of air to be projected in the area of the neck 2 of the objects 1.

Support rail 6 and the air stream are thus, for example, located vertically at the same level, facilitating, in particular, the guiding of the objects 1 conveyed via the transport shuttles 7.

Compression chamber 5 has, for example, a tubular structure with a substantially rectangular and/or square cross-section, the stream of air being projected onto objects 1 in the area of its lower wall 8.

For this purpose, the compression chamber 5 includes, substantially in the middle of the lower wall 8, a channel 9, orientated in conveying direction 4, having, in particular, a transverse profile in the form of an inverted U. The transverse walls 10 of the channel are provided, for example, as mentioned earlier, with slits 11 capable of permitting the projection of the air stream.

Again according to the exemplary form of embodiment represented, support rail 6 is constituted, for example, by two guides 12, in particular secured to the lower wall 8 of compression chamber 5, on either side of channel 9.

The guides 12 are, for example, in the shape of an L, and located facing each other, the vertical arms of the said L's being secured to compression chamber 5, while their horizontal arms are provided, at their ends, with an additional thickness 13, capable of supporting the transport shuttles 7.

It will be noted that the additional thicknesses 13 thus facilitate the conveying of objects 1 by restricting the area of contact between the transport shuttles 7 and the support rail 6.

As mentioned earlier with regard to compression chamber 5, the support rail 6 is provided, for example, continuously along the entire conveying path.

The shuttles 7 have, for example, a surface the size of which is substantially the equal to, or greater than, the maximum size horizontal cross-section of the objects 1.

Thus, for example, in the case of conveying a bottle 1, in particular one of a cylindrical shape, transport shuttle 7 has a horizontal surface the size of which is greater than, or substantially equal to, that of the transverse cross-section of the cylinder.

More specifically, in the case, discussed at greater length hereinafter, of the use of a substantially circular shuttle 7, the diameter of the latter is greater than, or substantially equal to, the diameter of the body of the bottle 1.

In addition, according to the form of embodiment shown, shuttles 7 are designed, as applicable, to be capable of closing the necks 2 of the objects 1.

They thus enable them to be isolated from the exterior and improve conveying hygiene conditions.

Figure 2:
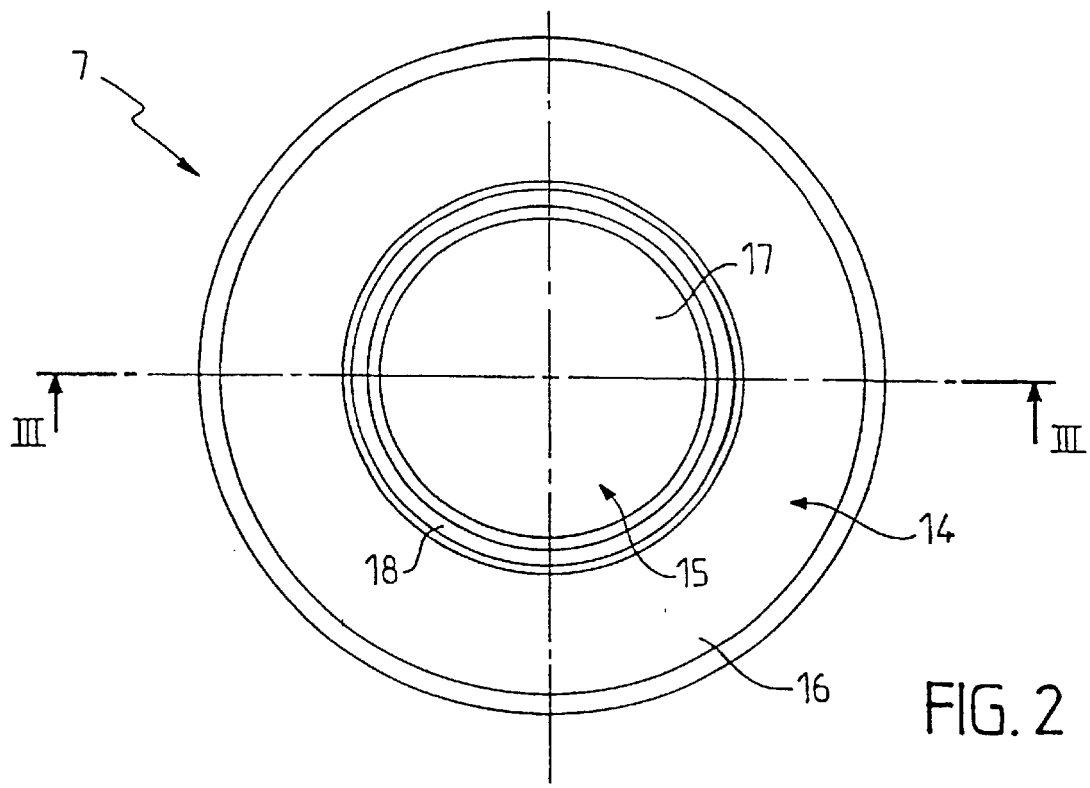
FIG. 2 is a top view of one of the elements of the conveying device according to the invention.
Figure 3:
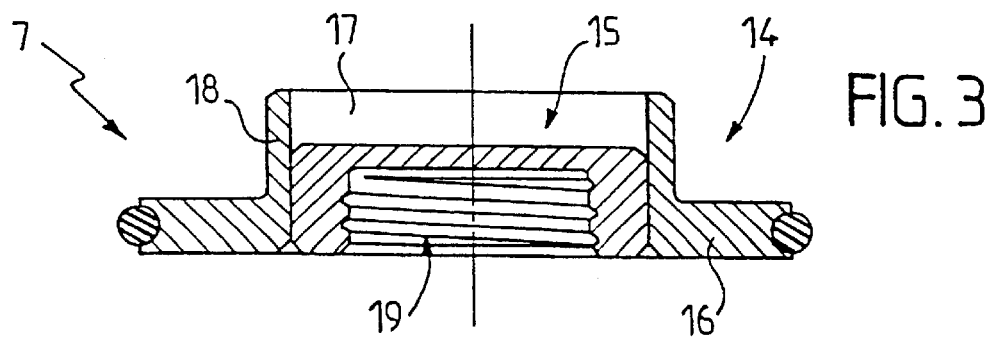
FIG. 3 is a cross-sectional view along line III—III of FIG. 2 of the element illustrated in the figure.

With reference, now, to FIGS. 2 and 3, it will be noted that the shuttles 7 are constituted, by a first element, 14, of a fixed size, co-operating with support rail 6, and by a second element, constituting a distance piece 15, between the first element 14 and neck 2 of the objects 1, having a size that is variable as a function of the diameter of the neck 2.

The first element 14 is constituted, in particular, by a disk 16, capable of sliding over the rail 6, provided with a central orifice 17 inside which is secured the second element 15. The disk 16 also includes, for example, around the central orifice 17, a central protuberance 18, in particular one that is tubular having a cylindrical cross-section.

According to this exemplary form of embodiment, the disk 16 slides over the additional thicknesses 13 of guides 12 constituting the support rail 6. in addition, the disk 16 is provided, on its periphery, with an O-ring, capable of cushioning impact between the shuttles 7.

The latter are further provided, in particular, in the area of the distance pieces 15, with a central cavity 19, having an internally threaded portion, capable of co-operating with an externally threaded portion provided on neck 2 of the objects 1, in such a way as to close them.

According to a first exemplary form of embodiment, not shown, the shuttles 7 are entirely monobloc.

According to another form of embodiment, corresponding to the one illustrated in FIG. 3, the element 14 and the distance piece 15 are separate, the inner cavity 19 being formed directly in the distance piece 15.

In this exemplary form of embodiment, the first element 14 and the distance piece 15 are assembled, for example, by bonding, keying or some other method.

Figure 4:
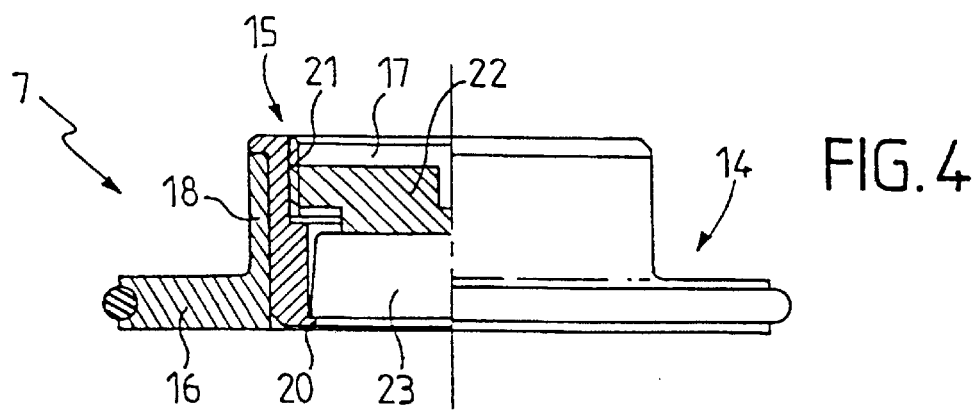
FIG. 4 is half cross-sectional view of a second exemplary form of embodiment of the element represented in preceding FIG. 3.

With reference, now, to FIG. 4, it will be noted that, according to a different form of embodiment, the distance piece 15 is of tubular design and has, at its lower end, an inner flange 20 and, at its upper end, an internally threaded portion 21, the shuttle 7 further including a nut 22, cooperating with the internally threaded portion, and a stopper 23, identical with the one designed to close the said objects 1, the distance piece 15 enabling the stopper 23 to be held between the flange 20 and the nut 22.

Figure 5:
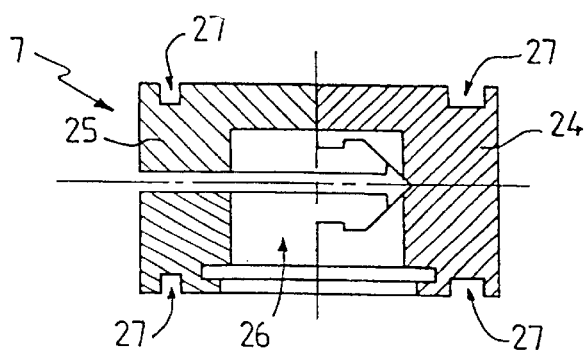
FIG. 5 is a cross-sectional view of a third exemplary form of embodiment of the element illustrated in preceding FIG. 2.

FIG. 5 shows an additional form of embodiment of shuttles 7. In this example, the shuttles 7 are constituted by two elements, 24, 25, fitting into one another and forming an inner cavity 26, capable of enabling neck 2 of the objects 1 conveyed to be held.

Still referring to this exemplary form of embodiment, the shuttles 7 are provided with at least two lateral grooves 27, capable of permitting, by cooperating with guide cams, the opening and/or closing of the shuttles 7 to disengage and/or install the objects 1.

It should also be noted that a shuttle 7 provided with an umbrella means penetrating the body 2 of the objects 1 to enable them to be held could also be contemplated.

With further reference to FIG. 1, it will be seen that, in the event of using shuttles 7 such as those shown in FIGS. 3 or 4, the disk 16 is provided, between support rail 6 and lower wall 8 of compression chamber 5, while the central protuberance 18 is located, at least partially, inside channel 9.

Incidentally, it should be noted that, in the event of using shuttles 7 functioning on an inter-fitting basis, as illustrated in FIG. 5, the shuttles 7 would then be provided, almost entirely, inside the channel 9.

Furthermore, in order to avoid any difficulties connected with excessive compression inside objects 1, the provision of a vent on the shuttles 7 could be contemplated.

This being said, according to the exemplary form of embodiment illustrated, the compression chamber 5 is also capable of enabling a stream of air to be projected in a direction opposed to that of conveying of the objects 1, as shown by arrow 28, so as to enable shuttles 7 to return.

The compression chamber 5 thus has, for example, on its upper wall 29, slits 30, capable of allowing the air stream to be projected in the said direction 28 opposed to that of conveying, projection of the air stream in the conveying direction 4 being carried out, as mentioned earlier, for example, in the area of lower wall 8 of the compression chamber 5.

In addition, in to permit the return of shuttles 7, the conveying device according to the invention includes, in particular, guides 31 secured to the upper wall 29 of the compression chamber 5, on either side of the stream of air orientated in the direction 28, the guides 31 being, for example, similar to the guides 12 used in the lower portion of the compression chamber 5.

Guides 12, 31 and/or their additional thickness 13 and/or shuttles 7 and/or their disks 16 are constituted, for example, by materials facilitating their sliding over one another.

The present invention also relates to a device for loading objects 1 provided with a neck 2 or the like such as, for example, bottles, flasks or other articles, designed to enable the objects 1 to be put in place on the conveying device, mentioned earlier, in which the objects 1 are provided with a transport shuttle 7 in the area of their neck 2.

Figure 6:
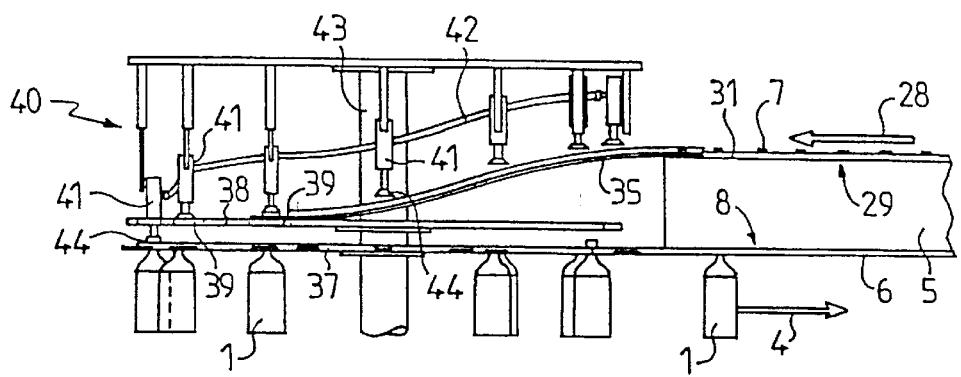
FIG. 6 is a side view schematically representing a loading device designed for a conveying device according to the invention.
Figure 7:
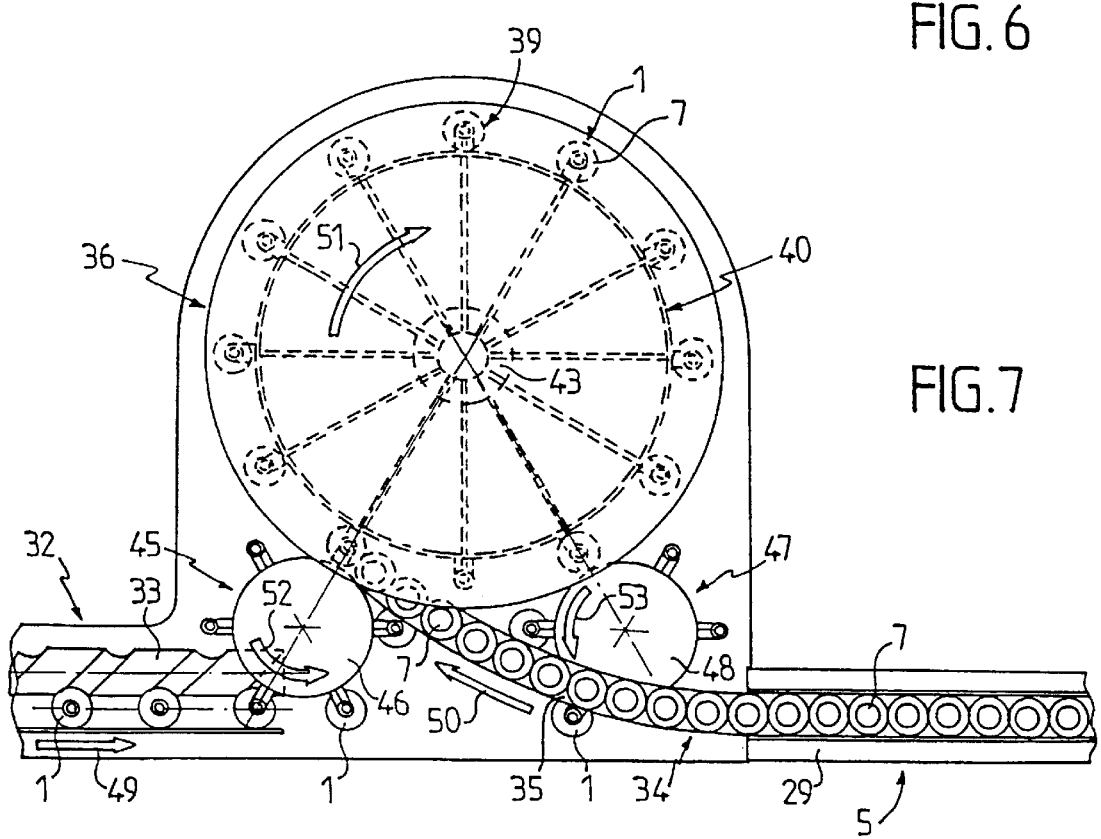
FIG. 7 is a top view according to FIG. 6.

With reference now to FIGS. 6 and 7, it will be noted that the loading device includes, according to the invention, means 32 for causing the said objects 1 designed to be equipped with a shuttle 7 to move along in the direction of arrow 49. Such means are, a worm screw 33, capable of regulating the upstream flow of the objects 1 to provide continuous high speed delivery.

In the event of the invention being applied to the loading and conveying of bottles, the latter can come, for example, from a blower.

The loading device according to the invention further includes means 34 for causing the shuttles 7 designed to be disposed on the objects 1 to move along in the direction indicated by arrow 50. Such means includes a gravity feed guide belt 35 arriving from upper wall 29 of compression chamber 5.

The loading device according to the invention further includes means 36 for driving the shuttles 7 and the objects 1 facing one another along a given path, for example a circular one, in the direction of arrow 51.

Thus, the driving means 36 are constituted, for example, by a platform 37 with grippers, capable of holding the objects 1, in particular in the area of their neck 2, and by a platform 38 provided with orifices 39 capable of receiving the shuttles 7, the platforms 37, 38 rotating, opposite one another, at the same speed so as to cause the orifices 39 and the holding ends of the grippers of platform 37 to face one another.

The said object 1 loading device further includes means 40 for securing the shuttles 7 to the necks 2 of the objects, the securing means 40 being capable of moving so as to be synchronized with the shuttles 7 and the objects 1, along the given path.

The securing means 40 are thus constituted, according to the exemplary form of embodiment illustrated, by a turntable of pistons 41, vertically orientated, co-operating with a guide cam 42, provided over the platforms 37, 38 above their periphery, via telescopic supports 43.

A piston 41 is provided, in particular, above each orifice 39 and their turntable rotates, in particular, at the same speed as the platforms 37, 38, around the same drive shaft 43.

Because of the guide cam 42, the pistons 41 are lowered and, thanks, for example, to suckers 44 and screwing means, not shown, enable the shuttles 7 to be placed on the objects 1, in the area of their necks 2, with screwing taking place, in particular, in the area of gripper platform 37.

The loading device further includes, for example, means 45 for transferring the objects 1, in the direction of arrow 52, to gripper platform 37. These means includes a wheel 46, also provided with grippers the ends of which are capable of co-operating, tangentially, with the grippers provided on the gripper platform 37.

The loading device according to the invention further includes, according to the form of embodiment illustrated, means 47 for transferring the objects 1 equipped with shuttles 7 in the direction of arrow 53, in particular towards the lower wall, -8- of compression chamber 5 of the conveying device.

These means include a wheel 48, provided with grippers, substantially identical with the preceding wheel 46.

Other embodiments, within the grasp of a man of the art, could, of course, have been contemplated without thereby departing from the scope of the present invention.

It should be noted, incidentally, that, following conveying, the objects 1 can be unloaded by means, of a device functioning in substantially the same way as the aforementioned loading device.

What is claimed is:

1. A conveying device comprising:

a plurality of objects each having a neck;

a compression chamber means for projecting a stream of air onto said plurality of objects in a conveying direction;

a support rail oriented in the conveying direction; and a plurality of transport shuttles cooperative with said support rail, each of said plurality of transport shuttles being removably secured respectively to the neck of said plurality of objects.

2. The conveying device of claim 1, said compression chamber means positioned over said plurality of objects for projecting the stream of air in an area of the neck of said plurality of objects.

3. The conveying device of claim 1, each of said plurality of transport shuttles having a surface which is no less than a maximum horizontal cross-sectional area of each of said plurality of objects.

4. The conveying device of claim 1, each of said plurality of transport shuttles closing the neck of respective said plurality of objects.

5. The conveying device of claim 1, each of said plurality of transport shuttles comprising a first element of a fixed size and a second element, said first element cooperative with said support rail, said second element comprising a distance piece positioned between said first element and the neck of said plurality of objects.

6. The conveying device of claim 5, said first element comprising a disk capable of sliding over said support rail, said disk having a central orifice, said second element secured inside of said central orifice.

7. The conveying device of claim 5, said distance piece being tubular, said distance piece having an inner flange at a lower end thereof and an internally threaded portion at an upper end thereof, each of said plurality of transport shuttles having a nut cooperative with said internally threaded portion, each of said plurality of transport shuttles having a stopper, said distance piece enabling said stopper to be held between said inner flange and said nut.

8. The conveying device of claim 1, said compression chamber means for projecting a stream of air in a direction opposed to said conveying direction.

9. The conveying device of claim 8, said compression chamber means comprising an upper wall having a slit formed therein, said slits permitting the projection of the stream of air in said direction opposed to said conveying direction, the projection of the stream of air in said conveying direction being adjacent a lower wall of said compression chamber means.

10. The conveying device of claim 1, further comprising:

means for moving said plurality of objects toward said compression chamber means;

means for moving said plurality of transport shuttles toward said compression chamber means;

means for driving said plurality of objects and said plurality of transport shuttles so as to face one another along a given path; and means for securing said plurality of transport shuttles to the neck of respective objects of said plurality of objects, said means for securing moving synchronously with said plurality of objects and said plurality of transport shuttles along said given path.

* * * * *